United States Patent [19]

Kanai et al.

[11] 4,280,464
[45] Jul. 28, 1981

[54] FUEL INJECTION CONTROL SYSTEM FOR INTERNAL COMBUSTION ENGINE

[75] Inventors: Seikichi Kanai; Kunihiko Komiyama; Koichi Togashi, all of Oyama, Japan

[73] Assignee: Kabushiki Kaisha Komatsu Seisakusho, Tokyo, Japan

[21] Appl. No.: 43,628

[22] Filed: May 30, 1979

[30] Foreign Application Priority Data

May 29, 1978 [JP] Japan .................. 53/63384

[51] Int. Cl.³ .................... F02M 51/00; F02M 37/04
[52] U.S. Cl. .................................. 123/447; 123/478; 123/499
[58] Field of Search .................. 123/139 AS, 139 AT, 123/139 AK, 139 E, 32 AE

[56] References Cited

U.S. PATENT DOCUMENTS

| | | | |
|---|---|---|---|
| 2,984,231 | 5/1961 | Cummins | 123/139 AT |
| 3,908,621 | 9/1975 | Hussey | 123/139 AT |
| 3,921,604 | 11/1975 | Links | 123/139 E |
| 3,943,901 | 3/1976 | Takahashi et al. | 123/139 AS |
| 4,069,800 | 1/1978 | Kanda et al. | 123/139 E |
| 4,091,784 | 5/1978 | Seilly et al. | 123/139 AS |
| 4,170,974 | 10/1979 | Kopse et al. | 123/139 AT |

FOREIGN PATENT DOCUMENTS 51-18010  6/1976  Japan .

Primary Examiner—Ira S. Lazarus
Assistant Examiner—Magdalen Moy
Attorney, Agent, or Firm—Armstrong, Nikaido, Marmelstein & Kubovcik

[57] ABSTRACT

A fuel injection control system for an internal combustion engine, comprising an injection pump connected to the engine and driven thereby, a fuel injection valve connected to the injection pump, the fuel injection valve having a piston chamber and a plunger chamber defined therein, a solenoid-operated spool valve connected to the injection pump on its input side and the piston chamber of the fuel injection valve on its output side, a solenoid-operated metering valve connected to the injection pump on its input side and the plunger chamber of the fuel injection valve on its output side, and a controller connected to the spool valve and the metering valve for controlling the same.

3 Claims, 1 Drawing Figure

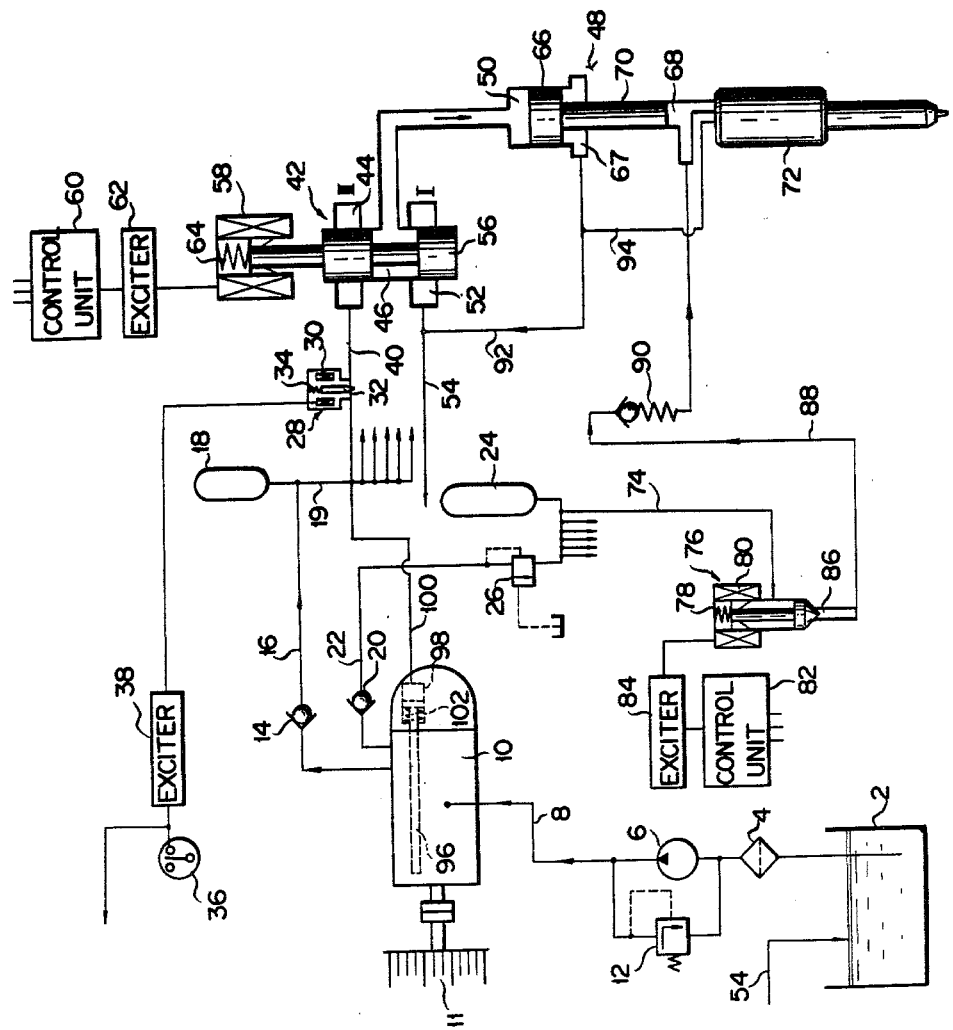

FUEL INJECTION CONTROL SYSTEM FOR INTERNAL COMBUSTION ENGINE

BACKGROUND OF THE INVENTION

This invention relates to a fuel injection control system for internal combustion engines. A fuel injector for internal combustion engines is well known which comprises a fuel injection valve having a servo-piston of a large diameter and a plunger of a small diameter and a fuel injection nozzle connected thereto, a pressure differential of the fuel introduced from a pressurized fuel supply source into said servo-piston and plunger acting to open and shut said fuel injection nozzle thereby enabling a high pressure fuel injection to be made.

Disclosed in the Japanese Pat. No. 51-18010 is a unit injector wherein the timing and amount of fuel injection etc. can be controlled by one solenoid-operated spool valve. This system is, however, disadvantageous in that since the metering of fuel is made during draining of the spool valve, the moving speed of the valve tends to become unstable, and consequently changes in the amount of metering are liable to occur.

SUMMARY OF THE INVENTION

It is therefore an object of the present invention to provide a fuel injection control system for an internal combustion engine which can enhance the starting-off of the engine.

Another object of the present invention is to provide a fuel injection control system for an internal combustion engine which can provide a quick and accurate metering of the fuel to be injected.

A still further object of the present invention is to provide a fuel injection control system for an internal combustion engine which can enhance the fuel combustion efficiency by controlling the amount of fuel delivered by a fuel injection pump especially at high idling of the engine or under a partial load condition thereof.

In accordance with an aspect of the present invention, there is provided a fuel injection control system for an internal combustion engine, comprising an injection pump means connected to the engine and driven thereby, said injection pump means being connected to a source of fuel supply, a fuel injection valve means connected to said injection pump means, said fuel injection valve means having a piston and a plunger formed therein and also having a piston chamber and a plunger chamber defined therein, a solenoid-operated spool valve means connected with said injection pump means on its input side and the piston chamber of said fuel injection valve means on its output side, and a solenoid-operated metering valve means connected to said injection pump means on its input side and the plunger chamber of said fuel injection valve means on its output side.

A first accumulator is provided between said injection pump means and said solenoid-operated spool valve means and further a shut-off valve means is connected between said first accumulator and said spool valve means. The shut-off valve means is adapted to close when the engine is not in operation and open when the engine is in operation thereby preventing the occurrence of a pressure drop in the line connecting said injection pump means with said shut-off valve means when the engine is not in operation. The solenoid-operated spool valve means and the solenoid-operated metering valve means are connected to a controller means so as to be controlled thereby. Since the metering valve means is separately provided, a quick and accurate metering of the fuel for injection can be accomplished.

A fuel delivery control means is mounted in the injection pump means for controlling the amount of fuel to be delivered by the fuel injection pump especially at high idling of the engine or under a partial load condition thereof thereby improving the overall fuel combustion efficiency.

The injection pump means is generally a plunger pump, and the delivery control means comprises a rack and pinion mechanism.

A pressure chamber of the delivery control means is connected to the line including the first accumulator, thereby forming a feed-back circuit for the injection pump means. If the pressure in the feed-back circuit is lower than that of a preset value for operating the fuel injection valve means, the rack is urged by a spring to cause a maximum amount of fuel to be delivered by the injection pump means. This is normally the case when the engine is operated under a full load condition. However, when the engine is at high idling condition or operated under a partial load condition, the presssure in the feed-back circuit becomes higher than the preset operating pressure of the fuel injection valve means and which pressure is high enough to move the rack against the biasing force of the spring in such a direction as to reduce the amount of delivery of fuel from the injection pump means.

The movement of the rack is transmitted to a plunger of the plunger pump through the pinion thereby controlling the amount of fuel delivered therefrom.

The above and other objects, features and advantages of the present invention will be readily apparent from the following description taken in conjunction with the accompanying drawing.

BRIEF DESCRIPTON OF THE DRAWING

The attached drawing shows an overall hydraulic circuit of the present invention with component parts thereof shown in a simplified form.

DETAILED DESCRIPTION OF THE INVENTION

The present invention will now be described in detail below by way of an embodiment with reference to the accompanying drawing.

The fuel in a fuel tank 2 is introduced through a filter 4 into a low pressure pump 6. The delivery side of the low pressure pump 6 is connected through a line 8 to an inlet side of a fuel injection pump 10 which is connected to an engine 11 so as to be driven thereby. A relief valve 12 is connected between the input and output sides of the low pressure pump 6. One of the outputs of the fuel injection pump 10 is connected through a check valve 14 and a line 16 to a first accumulator 18, whilst another output is connected through a check valve 20 and a line 22 to a second accumulator 24. A relief valve 26 is installed in the line 22. On the delivery side of the first accumulator 18, the line 16 is divided into branch lines 19, the number of which corresponds to that of the engine cylinders, each line 19 being provided with a shut-off valve 28. The shut-off valve 28 comprises a solenoid 30, a needle 32 which is rendered operative when the solenoid 30 is energized, and a spring 34. The solenoid 32 of the shut-off valve 30 is electrically connected through an exciter 38 with a terminal of a switch 36. The switch 36 is interlocked with the switch of the engine 11. When the engine 11 is running, the shut-off valve 28 is opened by energization of its solenoid, whilst when the switch of the engine is turned off, the solenoid 30 is deenergized and the needle 32 is urged by the spring 34 to close the shut-off valve 28.

The shut-off valve 28 is connected through a line 40 to an inlet port 44 of a solenoid-operated spool valve 42. The spool valve 42 includes an outlet port 46 which is connected to a servo-piston chamber 50 of a fuel injection valve 48 and a drain port 52 which is connected through a spill way 54 to the fuel tank 2. The spool valve 42 has a spool 56 and a solenoid 58 which is electrically connected through an exciter 62 with a control unit 60. When the solenoid 58 is deenergized, the spool valve 42 is urged by a spring 64 to a first position in which the servo-piston chamber 50 is allowed to communicate with the spill way 54. When the control unit 60 will generate a control signal energizing the solenoid 58 to move the spool 56 so that the spool valve 42 is changed over to its second position wherein the servo-piston chamber 50 is connected through the lines 40 and 16 to the fuel injection pump 10.

The fuel injection valve 48 comprises a servo-piston 66 of a large diameter that is slidably mounted in the servo-piston chamber 50 and a plunger 70 of a small diameter that is slidably mounted in a plunger chamber 68. The fuel injection valve 48 has a fuel injection nozzle 72 mounted thereto. The ratio of the cross-sectional area of the servo-piston 66 to that of the plunger 70 will determine the compressibility (pressure increase ratio) of the fuel injected by the nozzle 72.

Whilst, in the similar manner as in the case of line 19 from the first accumulator 18, the line from the second accumulator 24 is divided into branch lines 74, the number of which corresponds to that of engine cylinders, each of lines 74 being connected to a metering valve 76. The metering valve 76 is normally closed by the biasing force of a spring 78, but it is opened when its solenoid 80 is energized. The solenoid 80 is electrically connected through an exciter 84 with a control unit 82. The control unit 82 is operatively connected with the aforementioned control unit 60. The metering valve 76 has an outlet port 86 which is connected through a line 88 and a check valve 90 to the plunger chamber 68 of the fuel injection valve 48.

A drain chamber 67 of the fuel injection valve 48 formed under the servo-piston 66 is connected through a line 92 to the spill way 54, and the drain chamber of the fuel injection nozzle 72 is connected through lines 92 and 94 to the spill way 54. In the present invention, the provision of the solenoid-operated metering valve 76 enables a fuel metering to be made at high rate of accuracy. In brief, according to the present invention, upon completion of fuel injection, the fluid under high pressure is drained immediately so that the fluid pressure may drop to approximately atmospheric pressure. Subsequently, metering of the fuel is made independently by the metering valve 76 which is installed separately from the spool valve 42 so that the metering of fuel can be made with an excellent response and at high rate of accuracy.

The above-mentioned injection pump 10 is usually a plunger pump, and the ratio of the amount of the fuel to be delivered into the line 16 to that into the line 22 by the fuel injection pump 10 is preferrably selected to be equal to the pressure increase ratio of the fuel injection valve 48. In brief, where the ratio of the sectional area of the servo-piston 66 to that of the plunger 70 is 6:1, it is desirable to select the ratio of the amount of fuel to be delivered into the line 16 to that into the line 22 to be 6:1. In general, the amount of fuel to be delivered by a plunger pump is a function of the speed of rotation of the pump where the diameter, the stroke length and the number of plungers are fixed. Further, the amount of fuel to be injected by the fuel injection nozzle 72 varies with the engine's load condition, i.e. partial load condition or full load condition even when the speed of rotation of the engine is constant.

Therefore, according to the present invention, an oblique passage is cut on the surface of the plunger of the injection pump 10 so that rotation of the plunger relative to the cylinder thereof can provide adjustments of the fuel injection period and hence the amount of fuel delivered by the injection pump 10. The technique of cutting the passage on the surface of the plunger to control the amount of delivery of fuel is disclosed in the Japanese Utility Model Laying-Open Publication No. 50-54420. In the present invention, a rack and pinion mechanism is employed as a plunger rotating means. Formed at right hand end of a rack 96 is a pressure chamber 98 which is connected through a line 100 to the first accumulator 18 thereby forming a feed-back circuit. When the engine 10 is running, the pressure in the feed-back circuit including the first accumulator 18 is less than the biasing force of the spring 102, and therefore the rack 96 is urged to the right in the drawing so as to allow the fuel injection pump 10 to deliver a maximum amount of fuel. However, under a partial load condition or at the time of high idling, the pressure in the feed-back circuit connected to the first accumulator 18 or the pressure in the pressure chamber 98 will increase so that the rack 96 is moved to the left against the biasing force of the spring 102. Axial movement of the rack 96 is translated into rotary motion of a pinion (not shown) so as to turn the plunger and reduce the amount of fuel to be delivered by the fuel injection pump 10.

The operation of the fuel injection control system according to the present invention will now be described below.

The fuel in the tank 2 is supplied by the low pressure pump 6 into the injection pump 10 driven by the engine 11. A part of the fuel is supplied by the injection pump 10 through the check valve 14 and line 16 into the first accumulator 18, whilst the remainder of the fuel is sent by the pump through the check valve 20 and line 22 into the second accumulator 24. The fluid flowing through the line 16 serves as working oil urging the servo-piston 66 of the fuel injection valve 48, whilst the fluid flowing through the line 22 is consumed as the fuel injected by the fuel injection valve 72. When the engine is in operation, the shut-off valve 28 is opened, and so the working oil in the first accumulator 18 is introduced through the shut-off valve 28 and the line 40 into the inlet port 44 of the solenoid-operated spool valve 42.

When the solenoid 58 is energized by a control signal generated by the control unit 60, the electromagnetic force of the solenoid 58 will move the spool 56 upwards against the biasing force of the spring 64 thereby communicating the inlet port 44 with the outlet port 46. Consequently, the working oil is introduced into the servo-piston chamber 50 thereby moving the servo-piston 66 downwards.

Whilst, the fuel from the second accumulator 24 is supplied through line 74 into the solenoid-operated metering valve 76. The solenoid 80 of the metering valve 76 is energized by a control signal generated by the control unit 82, and the electromagnetic force of the solenoid 80 permits the metering valve 76 to be opened against the force of the spring 78 so that the fuel can be introduced through line 88 and the check valve 90 into the plunger chamber 68 of the fuel injection valve 48.

If the pressure increase ratio of the fuel injection valve 48 or the ratio of the sectional area of the servo-piston 66 to that of the plunger 70 is set, for example, at 6, the pressure of the fuel within the plunger chamber 68 is increased as much as six times and is injected through the fuel injection nozzle 72. The input data sent by the engine 11 to the control units 60 and 82 includes trigger acceleration position, revolutional speed of the engine, boost pressure and exhaust gas temperature. Such data are processed by a microcomputer in the control units 60 and 82 in accordance with programs previously stored therein and pulses are sent out therefrom to the solenoids 58 and 80 through the exciters 62 and 84, respectively and energizing them so that an optimum amount of fuel injection and an optimum rate of fuel injection can be obtained.

Since the metering of fuel can be effected by means of the metering valve 76 which is installed separately from the spool valve 42, an accurate metering of fuel can be effected.

The above-mentioned shut-off valve 28 is closed when the switch of the engine 11 is turned off so as to deenergize its solenoid 30 and allow needle 32 to seat on its valve seat, and it is opened when the engine switch is turned on. If the shut-off valve 28 is not installed, when the engine 11 is stopped, the working oil within the first accumulator 18 will leak into the spill way 54 through the line 40, the inlet port 44 and drain port 52 of the spool valve 42 so that the pressure in the line including the first accumulator 18 will drop.

If the line pressure has dropped, it is required during starting of the engine to effect cranking of the engine 11 and rotate the injection pump 10 until the line pressure is raised to a pre-determined value.

As countermeasure for this, according to the present invention, the shut-off valve 28 is installed in the line 40 to prevent the pressure fall in the line when the engine is stopped. Accordingly, by turning the engine switch on and opening the shut-off valve 28, the servo-piston 66 can be actuated with excellent response by the pressure of the fluid accumulated in the first accumulator 18 and normal fuel injection can be made by the fuel injection nozzle 72, even when the number of revolutions of the crank is low during engine starting and so the injection pump 6 cannot supply a sufficient amount of working oil.

Further, according to the present invention, the amount of delivery of fuel from the injection pump 10 can be adjusted by the formation of the feed-back circuit 100 in the working oil line including the first accumulator 18, and therefore the fuel consumption rate at the time of high idling or under a partial load condition can be improved remarkably.

While the invention has been described and shown with particular reference to the preferred embodiment, it will be apparent that variations might be possible that would fall within the scope of the present invention, which is not intended to be limited except as defined in the following claims.

What is claimed is:

1. A fuel injection control system for an internal combustion engine, comprising:
    injection pump means connected to the engine and driven thereby, said injection pump means including delivery control means for controlling the delivery of fuel therefrom and connected to a source of fuel supply;
    first accumulator means connected to said injection pump means for receiving an output therefrom;
    solenoid-operated spool valve means connected to said first accumulator means;
    fuel injection valve means having a piston and a plunger formed therein and also having a piston chamber and a plunger chamber defined therein, the piston chamber being connected to said spool valve means;
    fuel injection nozzle means connected to said fuel injection valve means;
    shut-off valve means provided between said first accumulator means and said spool valve means and adapted to close when the engine is not in operation and open when the engine is in operation;
    second accumulator means connected to said injection pump means for receiving an output therefrom;
    solenoid-operated metering valve means connected to said second accumulator means for metering the amount of fuel injected through said fuel injection nozzle means, said metering valve means being connected to the plunger chamber of said fuel injection valve means; and
    control means connected to both solenoids of said spool valve means and said metering valve means for controlling the operation thereof wherein said delivery control means is connected to said first accumulator means and is operated by the pressure of fluid from said first accumulator means.

2. A fuel injection control system as recited in claim 1 wherein said solenoid-operated spool valve means has two positions and wherein the piston chamber of said fuel injection valve means is connected to drainage when said spool valve is in first position and the piston chamber is connected to said first accumulator means through said shut-off valve means when said spool valve means is at its second position.

3. A fuel injection control system as recited in claim 1 or 2 wherein said injection pump means is a plunger pump and said delivery control means comprises a rack and pinion mechanism and wherein the rack is adapted to move in axial direction by the pressure of fluid from said first accumulator means thereby controlling the delivery of said injection pump means.

* * * * *